(12) United States Patent
Tweedie

(10) Patent No.: US 7,971,398 B2
(45) Date of Patent: Jul. 5, 2011

(54) PHOTOVOLTAIC SOLAR PANEL MOUNTING SYSTEM

(76) Inventor: Richard Tweedie, Santa Rosa, CA (US)

( * ) Notice: Subject to any disclaimer, the term of this patent is extended or adjusted under 35 U.S.C. 154(b) by 319 days.

(21) Appl. No.: 12/407,952

(22) Filed: Mar. 20, 2009

(65) Prior Publication Data

US 2010/0236609 A1    Sep. 23, 2010

(51) Int. Cl.
*E04D 13/18* (2006.01)
(52) U.S. Cl. ............... 52/173.3; 52/506.6; 52/741.1
(58) Field of Classification Search ........... 52/173.3, 52/506.05, 506.06, 551, 552, 511, 747.1, 52/745.06; 248/200, 237
See application file for complete search history.

(56) References Cited

U.S. PATENT DOCUMENTS

| | | | | |
|---|---|---|---|---|
| 6,453,633 | B1 * | 9/2002 | Wilkinson et al. | 52/506.06 |
| 7,814,899 | B1 * | 10/2010 | Port | 126/623 |
| 7,895,808 | B1 * | 3/2011 | Wentworth et al. | 52/741.1 |

* cited by examiner

*Primary Examiner* — Brian E Glessner
*Assistant Examiner* — Gisele Ford
(74) *Attorney, Agent, or Firm* — Bay Area Technology Law Group PC

(57) ABSTRACT

A system and method for mounting photovoltaic solar panels onto a roof. The system includes first and second strut rails spaced from the roof employing a series of standoffs, the strut rails having a length, cross section, a base and side walls, side walls terminating with first and second turned in edges. First and second mounting fixtures are attached to the photovoltaic solar panels which are of a type and geometry enabling the solar panels to be removably appended to the strut rails. The first and second mounting fixtures can be applied to the photovoltaic solar panels before being elevated to a roof.

17 Claims, 6 Drawing Sheets

PHOTOVOLTAIC SOLAR PANEL MOUNTING SYSTEM

TECHNICAL FIELD

The present invention is directed to a system for mounting photovoltaic solar panels onto a roof in a safer, more expedient and efficient manner than has previously been possible. The present system includes self-grounding hardware much of which can be installed on the photovoltaic solar panels prior to elevating them to a roof top location thus dramatically increasing the safety factor of such an installation.

BACKGROUND OF THE INVENTION

Virtually all roof top solar installations involve the elevation and securement of photovoltaic solar panels that are fixed in place by standoffs that penetrate the roof to tie the installation into structural rafters Horizontally aligned rails hold the panels off of a roof to allow cooling ventilation to their undersides while providing points of attachment for the panels.

Currently, the photovoltaic solar panel modules and mounting hardware are elevated to the roof prior to installation. The photovoltaic solar panels are roughly positioned over rails and wires attached and clamps installed. Again, all of this is done generally on an elevated and oftentimes slanted roof Clamps of various sizes dedicated to different module thicknesses, and corresponding nuts and bolts are slid down a channel in the previously installed rails The modules are visually positioned for plumb and tightened while holding them in place. This requires several operators. It is noted that if a first module is out of plumb, the entire panel row will be askew. If a wire is loose and requires checking, all clamps needed to hold a photovoltaic solar panel in place must be removed to lift such a module from its supporting rails. If a failed module is in the middle of a large array, there is no convenient way to remove it.

In creating the necessary electrical connections to the panels, the prior art suggests a lay-in lug with a slotted side entry attached to each module frame with a stainless steel star washer, screw and nut to penetrate generally employed anodized coatings. This is clearly necessary to create an acceptable ground connection A heavy gage continuous solid copper grounding wire is attached to each ground lug providing both electrical ground and protection against a potential lightening strike Panel grounding represents a significant portion of the time required to install a solar array. Also, mechanical tying of panels makes any subsequent adjustment or replacement quite difficult.

It is thus an object of the present invention to provide a system approach to the installation of photovoltaic solar panels improving upon current installation techniques and hardware It is yet a further object of the present invention to provide an improved system for mounting photovoltaic solar panels by combining offsite preassembly with redesigned hardware enabling a good deal of the assembly to be conducted at ground level and before panels are lifted to their eventual roof top installation.

It is yet a further object of the present invention to provide a system and method for mounting photovoltaic solar panels which can be carried out by a single installer and in a manner which is significantly safer than installations currently being conducted.

It is yet a further object of the present invention to provide a system and method of installing photovoltaic solar panels which enable the panels to be placed on floating standoffs isolated from thermal expansion while eliminating continuous ground wires between panels.

It is still another object of the present invention to provide pivot mounts for photovoltaic solar panels which provide for their immediate location and conveniently hinged application and removal in the event of panel misalignment or panel removal.

These and further objects will be more readily apparent when considering the following disclosure and amended claims

SUMMARY OF THE INVENTION

A system and method for mounting photovoltaic solar panels onto a roof, said system comprising first and second strut rails, each strut rail having a length and a cross section, each cross section having a base, side walls and first and second turned in edges, a first mounting fixture comprising a mounting block for removably appending said photovoltaic solar panels to a first of said strut rails, said first mounting block having a tooth at its first edge and a cam at its second edge, said tooth sized and positioned to fit beneath a first turned in edge of said first strut rail while said cam frictionally abuts a second turned in edge of said first strut rail and a second mounting fixture for removably appending said photovoltaic solar panel to said second strut rail, said second mounting fixture comprising a penetrating shaft preferably as a substantially cylindrically shaped member and worm gear, said penetrating shaft being sized to extend between said side walls of said second strut rail and further having a notch configured therein for capturing one of said first or second turned in edges upon rotation of said worm gear for releasably securing said photovoltaic solar panels to said second strut rail

BRIEF DESCRIPTION OF THE FIGURES

FIGS. 6A and 6B top and cross sectional side views, respectively, of a bridge employed as part of the electrical grounding system of the present invention

DETAILED DESCRIPTION OF THE INVENTION

The present invention involves system 10 for mounting photovoltaic solar panel 11 onto a roof. Mounting is generally carried out by providing standoffs best visualized by reference to FIGS. 2A and 2B.

Figure 2A:
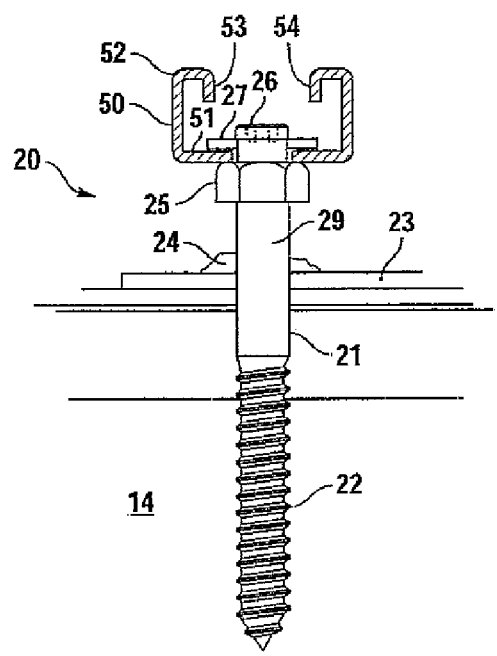
FIGS. 2A and 2B are detailed side partial cross sectional views of standoffs employed in securing the present system to a typical roof top installation.

Turning first to FIG. 2A, standoff 20 is in the form of threaded bolt 21 having a series of threads 22 which, upon installation, are embedded within rafter 14 FIG. 2A is specifically illustrative of a standoff used on a composite roof whereby composite roof surface 23 is penetrated by bolt 21 and sealant 24, such as Geocel 2300 Tripolymer, employed to prevent water intrusion below composite roof surface 23

Figure 1:
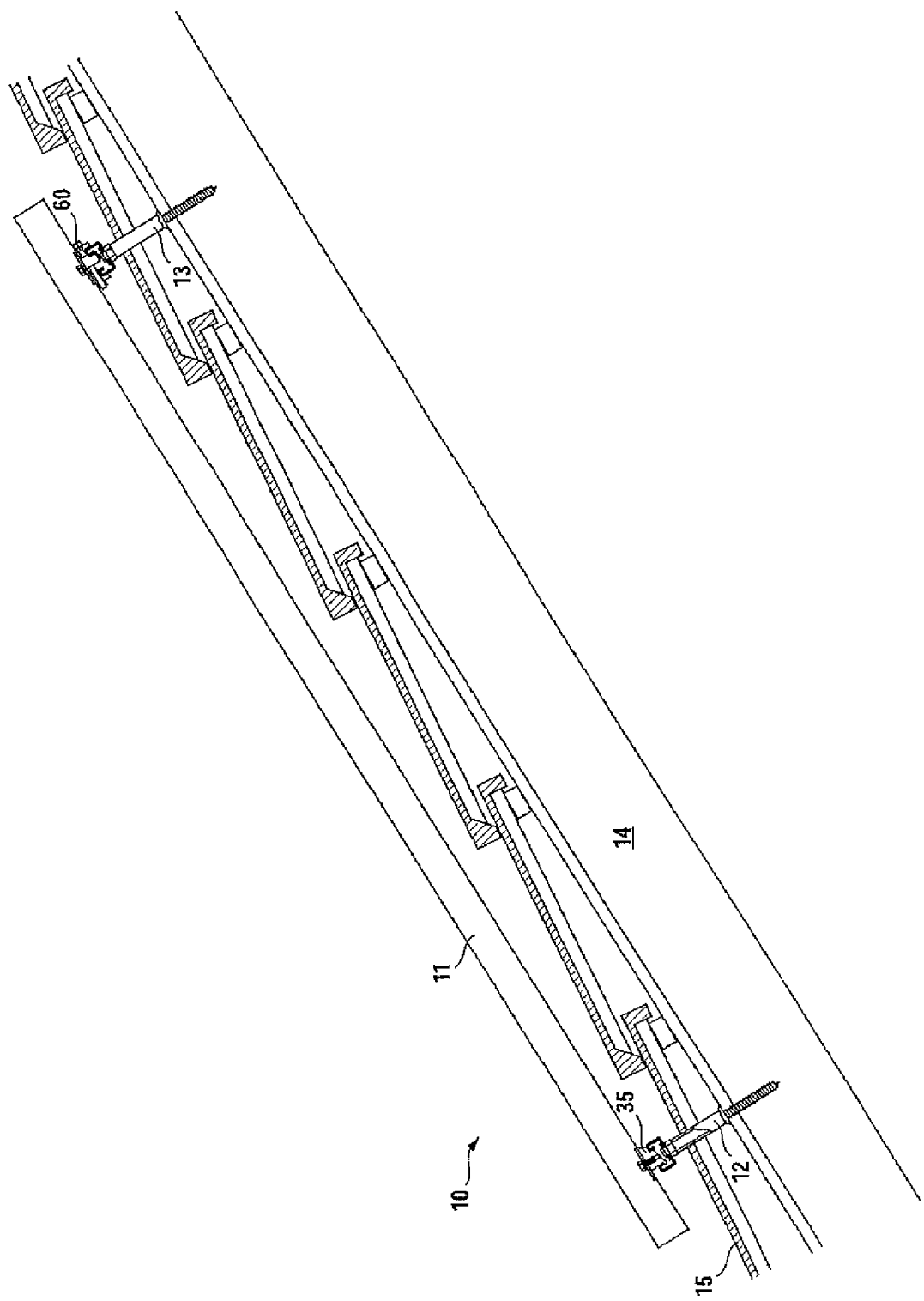
FIG. 1 is a side cross sectional view of an installation employing the present invention.

As noted, bolt 21 has shaft 29 of sufficient length as to space strut rail 50 from composite roof surface 23. As strut rail 50 will act to support the appropriate photovoltaic solar panel 11, the standoff height of head 25 of lag screw 21 is such that photovoltaic solar panel 11 will be provided with appropriate ventilation This is best seen in FIG. 1 noting standoffs 12 and 13 supporting photovoltaic solar panel 11 spaced from roof tiles 15.

Figure 2B:
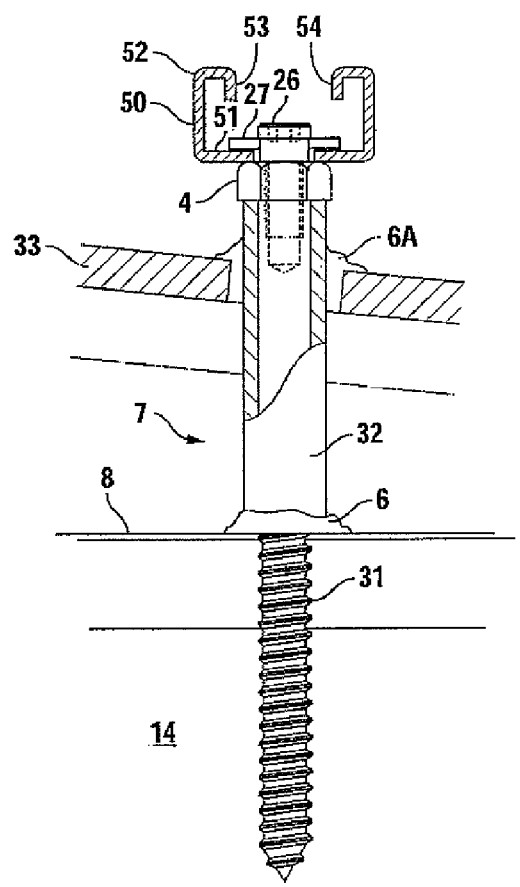

FIG. 2B illustrates lag screw 7 having threaded region 31 also penetrating rafter 14 In this illustration, a tile roof is the medium upon which photovoltaic solar panel 11 is to be applied whereby tar paper 8 acts as a water barrier including sealant 6 employed about rubber tubing 32 which, in turn, surrounds lag bolt 7. Tile 33 is further penetrated by the lag bolt again employing appropriate sealant 6A to prevent water penetration. The top of lag screw 7 is terminated by top 4 including washer 27 for vertical capture of strut rail member 50 Washer 27 is spaced from base 51 of strut rail 50 to allow the strut rails to "float" on the standoffs as depicted.

In operation, lag screws 7 and 21 are first applied to the appropriate composite or tile roof as shown in FIGS. 2A and 2B and spaced as parallel members upon the appropriate roof as discussed. Strut rail members 50 are generally provided in 10 ft. lengths and are applied end to end for the appropriate longitudinal lengths dictated by the number of photovoltaic solar panels noting that, ideally, the strut rail members 71 and 72 do not directly abut but are spaced a small distance 77 from one another to account for thermal expansion See FIGS. 6A and 6B. It further should be noted that lag screws 7 and 21 are placed upon the appropriate roof prior to the installation of any photovoltaic solar panel. Thus, a good deal of the hardware associated with the present installation is applied to a roof before the relatively heavy photovoltaic solar panels, themselves, are hoisted to the roof surface.

The strut rails 50 are of a standard variety generally composed of formed steel or extruded aluminum having a series of slotted openings 76/79 (FIG. 6B) evenly spaced along their lengths and further having cross sections, each cross section having base 51, side walls 52 and first and second turned in edges 53 and 54

Photovoltaic solar panels 11 are generally rectangular and appropriate mounting fixtures are placed proximate the corners of these panels for releaseable engagement with strut rails 50. The first of such mounting fixtures is depicted in reference to FIGS. 3A and 3B Turning first to FIG. 3A, first mounting fixture 35 is provided generally along a lower edge of photovoltaic solar panel 11 positioned to enable an installer to generally engage first mounting fixture 35 upon lower strut rail 50 in commencing the installation Most roofs are slanted, as noted in FIG. 1. In such an environment first mounting fixture 35 would be installed on the strut rail located on the vertically lower segment of the roof. In this regard, it is noted that both first mounting fixture 35 and second mounting fixture 60 (FIGS. 4A and 4B) are applied to photovoltaic solar panel 11 via bolt 2/2A prior to elevating the solar panels to the roof surface. Thus, most of the mounting hardware is fixed where appropriate at ground level prior to the lifting, balancing and positioning of the photovoltaic solar panels into their final positions.

Figure 5A:
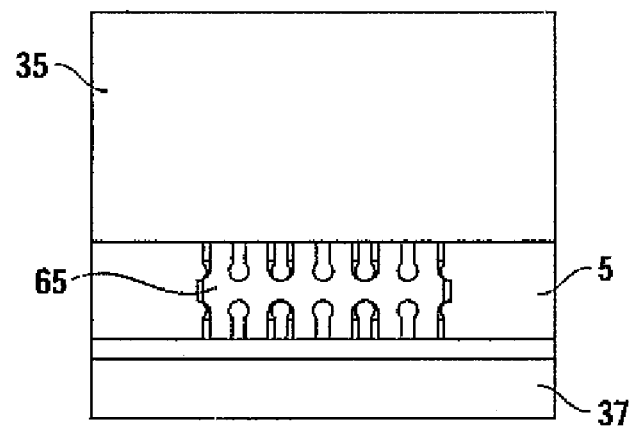
FIG. 5A is a side view of one of the mounting fixtures of the present invention employing a ground strip therein.

Turning back once again to FIGS. 3A and 3B, it is noted that first mounting fixture 35 comprises a mounting block 30 for removably appending photovoltaic solar panel 11 to a first of strut rails 50. First mounting block 30 has tooth 37 at its first edge and cam 36 at its second edge, tooth 37 sized and positioned to fit beneath first turned in edge 53 of strut rail 50 while cam 36 frictionally abuts second turned in edge 54 of strut rail 50. The elegance and simplicity of this design should not go unnoticed as an installer merely positions the lower edge of photovoltaic solar panel 11 on the first or lower strut rail 50 by hooking tooth 37 beneath turned in edge 53 whereupon cam 36 is pressed against second turned in edge 54 to create a snug connection In doing so, ground strip 65 of conductive material can be included within indented portion 5 of mounting block 30 to increase electrical contact between strut rail 50 and mounting block 30 proximate to tooth 37. See FIGS. 5A, B and C.

Figure 3A:
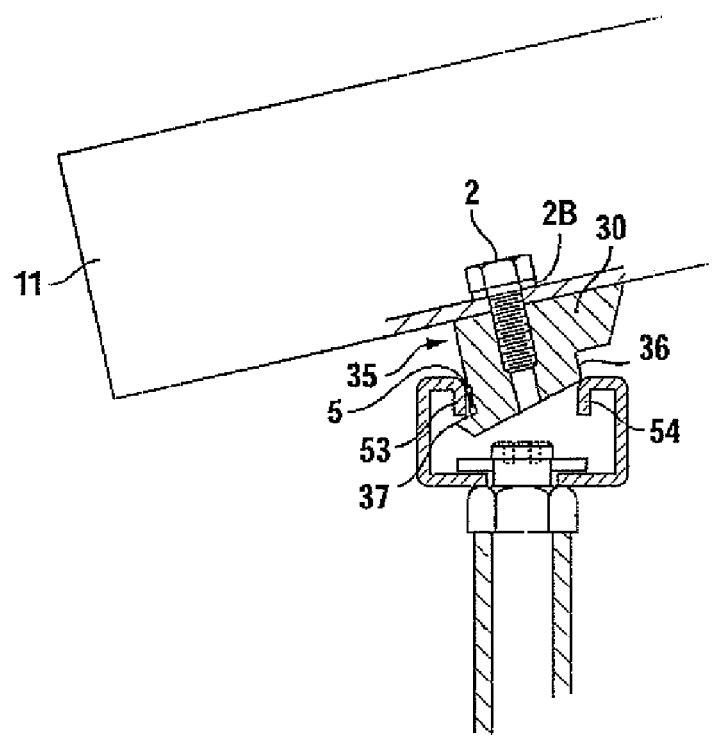
FIGS. 3A and 3B are side cross sectional views of a first mounting fixture employed to secure a photovoltaic solar panel to strut rails of the present invention.
Figure 3B:
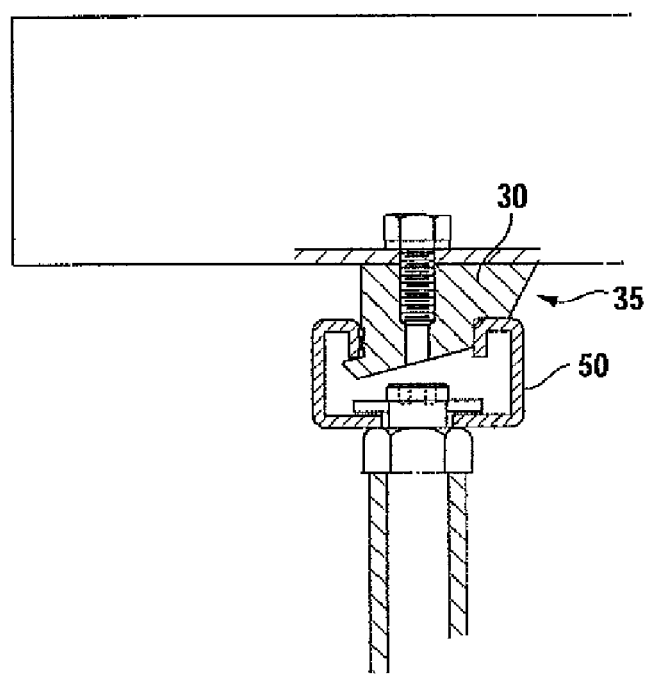
Figure 4A:
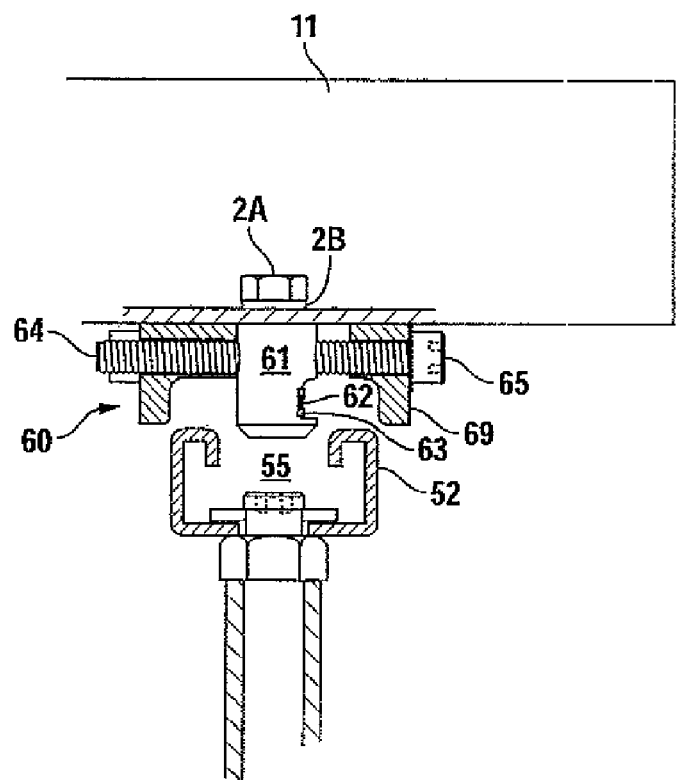
FIGS. 4A and 4B are partial cross sectional views of a second mounting fixture employed for securing photovoltaic solar panels to strut rails of the present invention
Figure 4B:
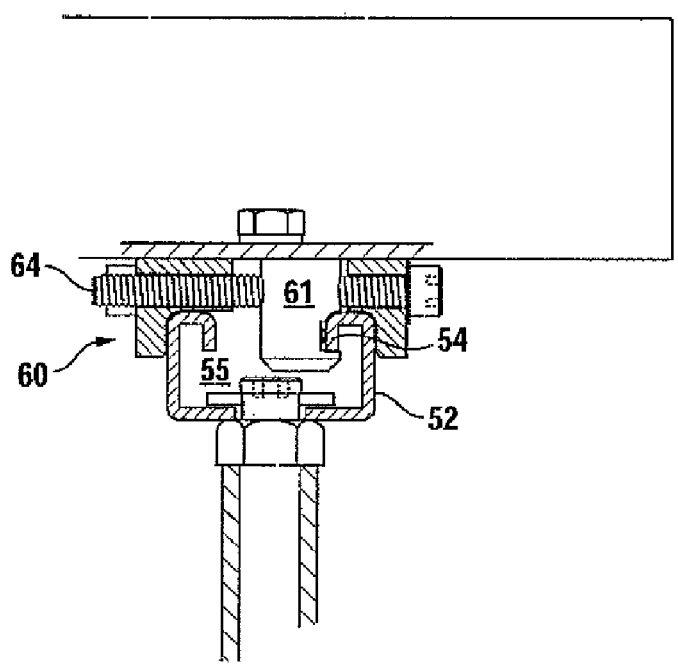

Once first mounting block 30 is positioned as depicted in FIGS. 3A and 3B, the top edge of photovoltaic cell 11 is positioned above the upper or second strut rail 50 best illustrated in reference to FIGS. 4A and 4B.

Turning to FIGS. 4A and 4B, second mounting fixture 60 is depicted for releaseably engaging photovoltaic solar panel 11 to strut rail 50 generally supported by standoff 7 or 21 proximate the upper most surface of the solar panel, once installed.

Figure 5B:
FIGS. 5B and 5C are edge and plan views, respectively, of the ground trip shown in FIG. 5A.
Figure 5C:
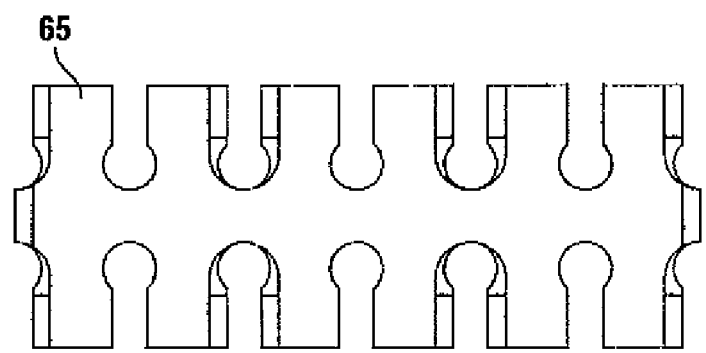

Both first mounting fixture 35 and second mounting fixture 60 are secured to photovoltaic solar panel 11 via bolts 2/2A generally held in position with captive star washer 2B. Second mounting fixture 60 comprises securing block 69 which rotatably supports a worm gear in the form of threaded member 64 rotatable by tamper resistant socket 65. Threaded member 64 passes within a complimentary threaded passageway located within a protrusion shaft preferably in the form of cylindrically shaped member 61 sized to extend between side walls 52 and within open area 55 contained within the strut rail. Cylindrically shaped member 61 is provided with notch 62 which can, in turn, capture grounding strip 65 (FIG. 5) to enhance electrical conductivity and thus electrical ground between voltaic solar panel 11 and strut rail 50. Once cylindrically shaped member 61 passes between side walls 52 of strut rail 50, socket 65 would be caused to accept an appropriate complimentary tool enabling an installer to rotate threaded member 64 for moving substantially cylindrically shaped member 61 into an orientation depicted in FIG. 4B for capturing turned in edge 54 as shown. Thus, between the frictional fit of first mounting fixture 35 and releaseable locking engagement of second mounting fixture 60, photovoltaic solar panel 11 is conveniently and effortlessly installed upon a suitable roof In fact, use of first and second mounting fixtures 35 and 60 enable photovoltaic solar panels 11 to be installed by a single installer thus reducing labor costs ordinarily associated with such an installation.

Figure 6A:
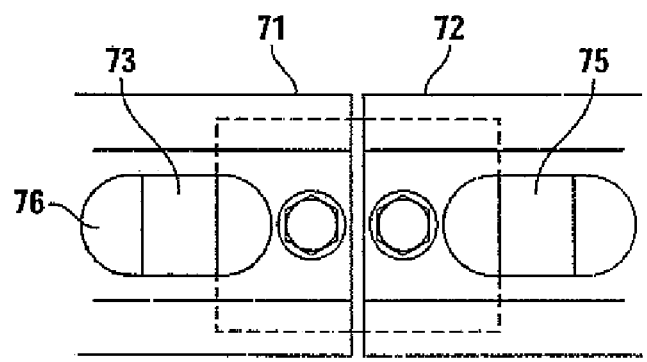
Figure 6B:
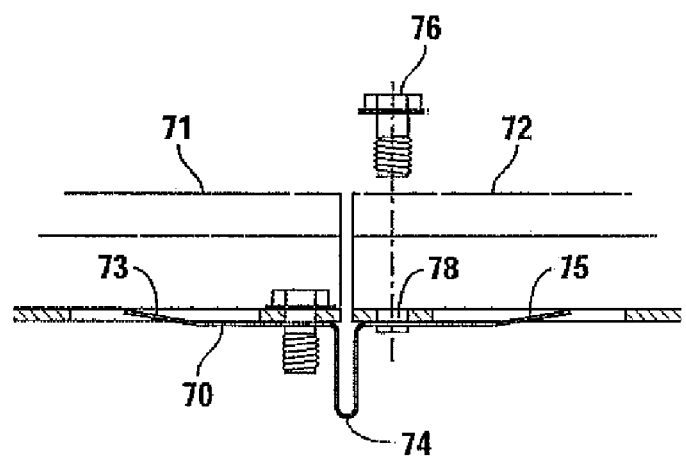
Figure 6C:
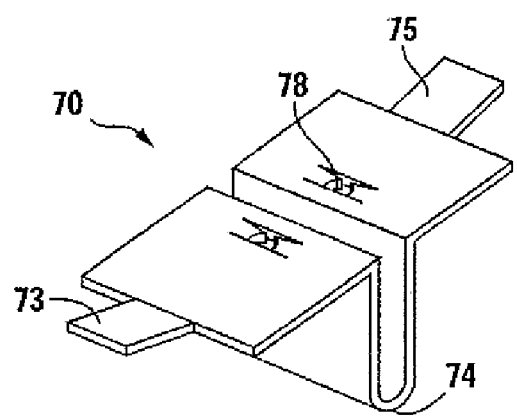
FIG. 6C is a perspective view of the bridge shown in FIGS. 6A and 6B

As previously noted, a typical installation would employ multiple first and second strut rail segments 50 placed substantially end to end with gap 77 therebetween of approximately 0.10" to accommodate for thermal expansion In referring to FIGS. 6A, 6B and 6C, a flexible bridge 70 can be placed between adjacent strut rail sections 71 and 72 being bolted through openings 78 in adjacent strut rails through the use of bolt 76 so that flex bridge tabs 73 and 75 make substantial physical contact with the strut rails having U-shaped section 74 therebetween. This not only enhances electrical contact between adjacent strut rails for grounding purposes but also enhances the structural soundness of the installation as mechanical connection between the strut rails is enhanced In summary, the present system employs standard slotted-hole strut rails 50 such as Uni-Strut, Power-Strut or B-line, supported by flat top standoffs 7/21 depending upon the type of roof involved in the photovoltaic solar panel installation Each standoff 7/21 can be provided with sleeve 32 such as a Hypalon rubber tubing for easy initial height adjustment further including a tapped hole for floating capture of strut rails 50 which prevents thermal expansion from deflecting the standoff, a major source of leaks. Standard 10 ft. strut rails 50 require three standoffs, all of which are fully floating. Standoffs 7/21 are equally suited to either composition shingle or tile roofs noting that only the lengths of the lag screws being different As noted previously, ends of the strut rails are separated by gap 77 generally about 0.10" to accommodate thermal expansion A flex bridge as depicted in FIGS. 6A, 6B and 6C provide mechanical support to cantilevered strut rail ends as well as ground coupling of the rails while still allowing for thermal expansion.

Panel mounting hardware in terms of first mounting fixture 35 and second mounting fixture 60 have been configured so that they can be attached to each module of a panel row prior to lifting them to the roof for improved safety and greatly reduced labor costs.

The first mounting block 30 acts like a hinge to provide easy access to wiring. This ability to immediately achieve attachment to strut rails 50 prevents panels 11 from sliding down the root slope thus greatly increasing safety. The upper ends of panels 11 support second mounting fixture 60 containing releaseable locks securing the panels to the rail members. Although not made a part of the present invention, it can include template fixtures used to accurately locate mounting hardware to the underside of panels 11. Fixture hardware placement assures that each panel installs for a perfect alignment. Since both first and second mounting fixtures 35 and 60 mount to the underside of each module 11, they are independent of module frame thickness. Hardware is therefore standardized to reduce inventory. Also, current panels require gaps of an inch or more between panels for existing clamps These can be eliminated by employing the present invention resulting in a smaller footprint for reduced spacing.

In addition to the above, the present invention eliminates the need for clumsy and costly ground wires by employing the strut rails to create the grounding path Module frame lengths provides leverage to allow first mounting fixtures 35 to wedge turned in ends of strut rails 50 forcing grounding strips 65 to penetrate anodized coatings on aluminum strut rails 50 thus grounding the module flame to the rails at each of the first and second mounting fixtures. Second mounting fixture 60 is also equipped with the same ground-piercing strip as the first mounting fixture 35 for as second mounting fixture 60 is tightened, panels are grounded through the use of strip 62 As a preferred embodiment, piercing elements of the ground strips ate twisted in opposite directions to force deeper penetration while precluding lateral shifts. Contact grease can be employed while excluding oxidation for prolonged life.

What is claimed is:

1. A system for mounting photovoltaic solar panels onto a roof, said system comprising first and second strut rails, each strut rail having a length and a cross section, each cross section having a base, side walls and first and second turned in edges, a first mounting fixture comprising a mounting block for removably appending said photovoltaic solar panels to a first of said strut rails, said first mounting block having a tooth at its first edge and a cam at its second edge, said tooth sized and positioned to fit beneath a first turned in edge of said first strut rail while said cam fictionally abuts a second turned in edge of said first strut rail and a second mounting fixture for removably appending said photovoltaic solar panel to said second strut rail, said second mounting fixture comprising a protruding shaft and worm gear, said protruding shaft being sized to extend between said side walls of said second strut rail and further having a notch configured within said protruding shaft for capturing one of said first or second turned in edges upon rotation of said worm gear for releasably securing said photovoltaic solar panels to said second strut rail.

2. The system of claim 1 wherein said photovoltaic solar panels are substantially rectangular wherein a plurality of said first mounting fixtures are affixed to a first edge thereof and a plurality of said second mounting fixtures are affixed to a second edge thereof.

3. The system of claim 1 wherein said second mounting fixture further comprises a securing bracket for rotatably securing a threaded shaft, said threaded shaft being threadably engaged to said protruding shaft.

4. The system of claim 3 wherein said threaded shaft further comprises an extremity having an interface for receiving a tool for rotating said threaded shaft and for moving said protruding shaft within said second strut rail.

5. The system of claim 1 further comprising a grounding strip sized to fit within said notch.

6. The system of claim 1 wherein said strut rails are further defined as comprising a series of apertures along their lengths.

7. The system of claim 6 further comprising a plurality of first and second strut rails positioned end to end when installed upon said roof.

8. The system of claim 7 wherein a gap is provided between said plurality of adjacent first and second strut rails.

9. The system of claim 8 further comprising an electrically conductive bridge spanning said gap between adjacent first and second strut rails.

10. The system of claim 1 further comprising a series of standoffs for mounting said strut rails onto and spaced from said roof, each of said standoffs comprising a first end for penetrating said roof and a second end for releaseably capturing a strut rail.

11. A method for mounting photovoltaic solar panels onto a roof comprising fixedly attaching a plurality of standoffs, said standoffs comprising first ends for penetrating said roof and second ends for releasably capturing a strut rail, appending first and second strut rails to said standoffs, each strut rail having a length and a cross section, each cross section having a base, side walls and first and second turned in edges, providing a plurality of first and second mounting fixtures each comprising a mounting block attached to said photovoltaic solar panels, applying said fixtures to said solar panels for removably appending said photovoltaic solar panels to said first and second strut rails, said first mounting block having a tooth at its first edge and a cam at its second edge, said tooth sized and positioned to fit beneath a first turned in edge of said first strut rail while said cam frictionally abuts a second turned in edge of said first strut rail, said second mounting fixture comprising a substantially cylindrically shaped member and worm gear, said substantially cylindrically shaped member being sized to extend between said side walls of said second strut rail and further having a notch configured within said substantially cylindrically shaped member for capturing one of said first or second turned in edges upon rotation of said worm gear, first applying said first mounting block to said first strut rails by first engaging said tooth beneath a first turned in edge of said first strut rail and rotating said solar panel to enable said cam to frictionally abut a second turned in edge of said first strut rail while inserting said substantially cylindrically shaped member between said side walls of said second strut rail and rotating said worm gear for securing said notch to a turned in edge of said second strut rail.

12. The method of claim 11 wherein said first and second mounting fixtures are applied to said photovoltaic solar panels prior to elevating said photovoltaic solar panels onto a roof.

13. The method of claim 11 further comprising installing a grounding strip within said notch prior to securing said second mounting fixture to a turned in edge of said second strut rail.

14. The method of claim 11 wherein a plurality of first and second strut rails are applied to said roof end to end.

15. The method of claim 14 wherein said first and second strut rails are applied to said roof while providing a gap between adjacent first and second strut rails.

16. The method of claim 15 further applying an electrically conductive bridge spanning said gap between adjacent first and second strut rails.

17. The method of claim 11 further comprising installing a grounding strip proximate said tooth located between said first mounting block and first turned in edge of said first strut rail.

* * * * *